(12) United States Patent
Hansen

(10) Patent No.: US 12,531,647 B2
(45) Date of Patent: Jan. 20, 2026

(54) INTENSITY-BASED OPTICAL MULTIPLEXING SYSTEMS AND METHODS

(71) Applicant: John Paul T. Hansen, Burien, WA (US)

(72) Inventor: John Paul T. Hansen, Burien, WA (US)

( * ) Notice: Subject to any disclaimer, the term of this patent is extended or adjusted under 35 U.S.C. 154(b) by 181 days.

(21) Appl. No.: 18/180,001

(22) Filed: Mar. 7, 2023

(65) Prior Publication Data

US 2023/0283398 A1 Sep. 7, 2023

Related U.S. Application Data

(60) Provisional application No. 63/317,452, filed on Mar. 7, 2022.

(51) Int. Cl.
| | | |
|---|---|---|
| H04J 14/00 | (2006.01) | |
| H04B 10/54 | (2013.01) | |
| H04J 14/02 | (2006.01) | |

(52) U.S. Cl.
CPC .......... *H04J 14/0227* (2013.01); *H04B 10/54* (2013.01); *H04J 14/00* (2013.01); *H04J 2203/00* (2013.01); *H04J 2203/0089* (2013.01)

(58) Field of Classification Search
CPC ...... H04B 10/54; H04J 14/00; H04J 2203/00; H04J 2203/0089
USPC .......................................... 398/43, 183, 186
See application file for complete search history.

(56) References Cited

U.S. PATENT DOCUMENTS

| | | | | |
|---|---|---|---|---|
| 7,162,136 B1 * | 1/2007 | Pertl | ..................... | G01J 1/0418 |
| | | | | 385/11 |
| 2004/0174473 A1 * | 9/2004 | Cavanaugh | ............... | G02F 1/31 |
| | | | | 349/96 |
| 2004/0234276 A1 * | 11/2004 | Hayashi | ............... | H04B 10/674 |
| | | | | 398/152 |

(Continued)

FOREIGN PATENT DOCUMENTS

CN 110061798 A * 7/2019

OTHER PUBLICATIONS

Feng et al: "Spectrally Overlaid DDO-OFDM Transmission Enabled by Optical Power Division Multiplexing", 2016 15th International Conference on Optical Communications and Networks (ICOCN), Sep. 24-27, 2016, pp. 1-3 (Year: 2016).*

(Continued)

*Primary Examiner* — Li Liu

(57) ABSTRACT

A method for multiplexing optical signals for transmission over a communication link includes receiving a set of input optical signals. Each input optical signal has an optical intensity at a given time in one of at least two amplitude states. The method further includes selectively adjusting the optical intensity of the input optical signals so that each input optical signal has a respective specific optical intensity for each of the at least two amplitude states. The respective specific optical intensity of each input optical signal in the at least two amplitude states differs such that the respective specific optical intensity of each input optical signal in the at least two amplitude states has a magnitude in which any combination of the input optical signals at any given time sums to a different combined magnitude. The input optical signals are combined to form a combined beam for transmission.

2 Claims, 7 Drawing Sheets

(56) References Cited

U.S. PATENT DOCUMENTS

| | | | | |
|---|---|---|---|---|
| 2005/0069333 A1* | 3/2005 | Moeller | ................ | H04B 10/64 |
| | | | | 398/202 |
| 2008/0080805 A1* | 4/2008 | Nakashima | ........... | H04L 7/0075 |
| | | | | 385/11 |
| 2013/0114078 A1* | 5/2013 | Honda | ............... | G01N 21/8806 |
| | | | | 356/237.1 |
| 2017/0294925 A1* | 10/2017 | Fazal | ...................... | H04J 14/06 |
| 2019/0140741 A1* | 5/2019 | Cheng | .............. | H04B 10/25753 |
| 2019/0379455 A1* | 12/2019 | Wang | .................... | H03M 3/468 |
| 2020/0336203 A1* | 10/2020 | Hassan | ................. | H04B 10/70 |

OTHER PUBLICATIONS

Han et al: "Power Division Multiplexing", 2016 IEEE/CIC International Conference on Communications in China (ICCC), Jul. 27-29, 2016, pp. 1-6 (Year: 2016).*

Gianluca Mazzini: "Power Division Multiple Access", ICUPC '98. IEEE 1998 International Conference on Universal Personal Communications, pp. 543-546 (Year: 1998).*

Wang et al: "An experimental study of power division multiplexing in visible light communication", Optics Communications 455 (2020) 124296, pp. 1-6 (Year: 2020).*

\* cited by examiner

INTENSITY-BASED OPTICAL MULTIPLEXING SYSTEMS AND METHODS

BACKGROUND

Technical Field

This disclosure pertains to optical communication, and in particular to systems and methods for multiplexing optical signals for data transmission over a communication link.

Description of the Related Art

In an increasingly connected world, data transmission via optical communication (i.e., using light signals) is critical for increased speed of data communication and data throughput. Effective multiplexing of optical signals is important for expanding the data transmission capacity of existing and future optical fiber networks. Multiplexing optical signals involves manipulation of the optical signals in different dimensions, such as time, space, frequency, and polarity. Effective multiplexing makes it possible to increase the data transmission capacity of individual optical fibers having a fixed transmission bandwidth.

Two prominent multiplexing methods in the field of optical communication are wavelength division multiplexing (WDM) and optical time division multiplexing (OTDM). WDM uses transmission of light at different wavelengths to combine optical signals on a single optical fiber. WDM systems are widely used because they enable expansion of capacity of existing optical networks without requiring more fiber to be deployed. The capacity of a given optical fiber can be expanded by deploying wavelength division multiplexers and demultiplexers at each end of the fiber.

OTDM is a multiplexing technique that allows multiple optical channels, typically low bit rate optical channels, to be combined in the time domain. Low-speed data communication channels are multiplexed over a fixed time period or "frame," which increases overall data transmission throughput. Each signal is transmitted over a communication channel by dividing the transmission frame into slots, and using different slots for transmitting portions of different signals. In a synchronized manner, the multiplexer allocates each channel to one or more specific time positions or slots in each frame, and the receiving demultiplexer is likewise time-synchronized to switch the data transmission output and output the individual channels.

Nevertheless, existing optical multiplexing methods and systems are complex and expensive to manufacture, deploy, and maintain. Improved optical multiplexing systems and methods, in particular for high-speed data communication, is desired.

BRIEF SUMMARY

Described herein are systems and methods for multiplexing optical signals for transmission over a communication link.

In at least one implementation, a system of the present disclosure includes an optical signal processor and an optical beam combiner. The optical signal processor has a set of optical inputs that receive the input optical signals, respectively. At any given time, each input optical signal has an optical intensity in one of at least two amplitude states, e.g., a state representing a logical data low value and a state representing a logical data high value. In some implementations, at any given time, the input optical signals may have an optical intensity in one of three or more amplitude states.

The optical signal processor is configured to selectively adjust the optical intensity of the input optical signals. The optical intensity of each input optical signal is adjusted such that each input optical signal has a respective specific optical intensity for each of the at least two amplitude states. The respective specific optical intensity of each input optical signal in the at least two amplitude states has a magnitude that differs such that, when the input optical signals are combined into a combined beam, the sum of the optical intensities of the input optical signals has a unique combined magnitude indicative of the particular input optical signals that are present in the combined beam. In other words, the respective specific optical intensity of each input optical signal in the at least two amplitude states has a magnitude in which any combination of the input optical signals at any given time in the combined beam sums to a different combined magnitude.

The optical beam combiner is configured to combine the set of input optical signals having the specific optical intensities to form the combined beam for transmission over the communication link.

The implementation described above may further include a plurality of optical transmitters configured to provide the set of input optical signals. Each of the optical transmitters is optically coupled to a respective optical input of the optical signal processor. Each optical transmitter is configured to provide an input optical signal at a first optical intensity when transmitting in a first amplitude state, e.g., representing a logical data high value, and to provide the input optical signal at a second optical intensity in a second amplitude state, e.g., when transmitting a logical data low value. The second optical intensity is different than the first optical intensity.

In various implementations, the optical signal processor selectively adjusts the optical intensity of the input optical signals before the optical beam combiner combines the input optical signals into the combined beam. In other implementations, the optical signal processor selectively adjusts the optical intensity of the input optical signals after the optical beam combiner combines the input optical signals.

In some implementations, the optical signal processor includes at least one neutral density filter that is arranged in a transmission path of at least one respective input optical signal. The neutral density filter has a light attenuation characteristic that selectively attenuates the optical intensity of the input optical signal to the respective specific optical intensity for the at least two amplitude states of the input optical signal.

In some implementations, the optical signal processor includes at least one fiber optic cable that is arranged in a transmission path of at least one respective input optical signal. The fiber optic cable has a light attenuation characteristic (e.g., due to a length of the cable) that selectively attenuates the optical intensity of the input optical signal to the respective specific optical intensity for the at least two amplitude states of the optical signal.

In some implementations, the optical signal processor includes at least two linear polarizers that are arranged in series in a transmission path of at least one respective input optical signal. The at least two linear polarizers have a difference in polarization angle that selectively attenuates the optical intensity of the input optical signal to the respective specific optical intensity for the at least two amplitude states of the input optical signal.

In some cases, the at least two linear polarizers include a first linear polarizer and a second linear polarizer. The transmission path of at least one input optical signal is arranged through the first linear polarizer before the optical beam combiner combines the input optical signals to form the combined beam. Thereafter, a transmission path of the combined beam is arranged through the second linear polarizer. The first and second linear polarizers have a difference in polarization angle such that the second linear polarizer selectively attenuates the optical intensity of the at least one input optical signal to the respective specific optical intensity for the at least two amplitude states of the at least one input optical signal.

In some cases, the at least two linear polarizers include a first linear polarizer for each input optical signal in the set of input optical signals, and a second linear polarizer. The transmission path of each input optical signal is arranged through a respective first linear polarizer before the optical beam combiner combines the set of input optical signals to form the combined beam. Each respective first linear polarizer has a polarization angle that is different than a polarization angle of the other respective first linear polarizers. Thereafter, a transmission path of the combined beam is arranged through the second linear polarizer. The second linear polarizer has a polarization angle that selectively attenuates the optical intensity of each input optical signal in the combined beam to the respective specific optical intensity for the at least two amplitude states of the respective input optical signal.

In some cases, the at least two linear polarizers include a first linear polarizer and a second linear polarizer for each input optical signal, and the transmission path of each input optical signal is arranged through both a first linear polarizer and a second linear polarizer before the optical beam combiner combines input optical signals to form the combined beam. The respective first and second linear polarizers for each input optical signal have a difference in polarization angle that selectively adjusts the optical intensity of the respective input optical signal to the respective specific optical intensity for the at least two amplitude states of the respective input optical signal.

For implementations in which each input optical signal in the set of input optical signals has an optical intensity at a given time in one of three or more amplitude states, the optical signal processor is configured to selectively adjust the optical intensity of the input optical signals to have a respective specific optical intensity in the three or more amplitude states. The respective specific optical intensity of each input optical signal in the three or more amplitude states differs such that the magnitude of the respective specific optical intensity of the input optical signal in any combination of the input optical signals at any given time sums to a different combined magnitude in a combined beam.

Because the combined magnitude of the combined beam at any given time uniquely indicates the combination of input optical signals that are on and transmitting, a measurement of the combined magnitude of the combined beam at any given time is indicative of the input optical signals that are conveying a logical data high value at that time. Measuring the optical intensity of the combined beam at intervals over time (synchronized with the anticipated data rate) and identifying the input optical signals that are on at each measurement interval allows the data being conveyed by the input optical signals to be converted into useful digital data signals at a receiving end of the communication link.

DETAILED DESCRIPTION

In the field of software, the concept of bit-masking provides a method for determining the composition of bits in a byte. To illustrate the concept, one may imagine a group of specific numbers that, when combined, have different sums for each combination of the numbers. Given any existing sum, it is possible to determine from the sum which specific numbers were added to produce the sum. In this way, a measurement of a sum is able to describe the composition of the numbers that produced the sum.

The present disclosure expands on this concept and provides a method of multiplexing optical signals into a combined beam in which the intensity of the combined beam at any given time is a sum of the optical intensities of the individual optical signals that were combined to produce the combined beam. The optical intensities of the individual optical signals are adjusted to have respective specific optical intensities such that any combination of the input optical signals at any given time sums to a different combined magnitude in the combined beam. A measurement of the intensity of the combined beam at any given time enables quick identification of which input optical signals are "on" at that given time, and thus contributing to the combined magnitude in the combined beam, with the rest of the input optical signals necessarily being "off" at that given time. Knowing the state of the input optical signals ("on" or "off") at any given time enables an analyzer receiving the combined beam to produce digital data signals representing the data conveyed by the input optical signals. The digital data signals may then be electronically relayed to a desired destination.

Figure 1:
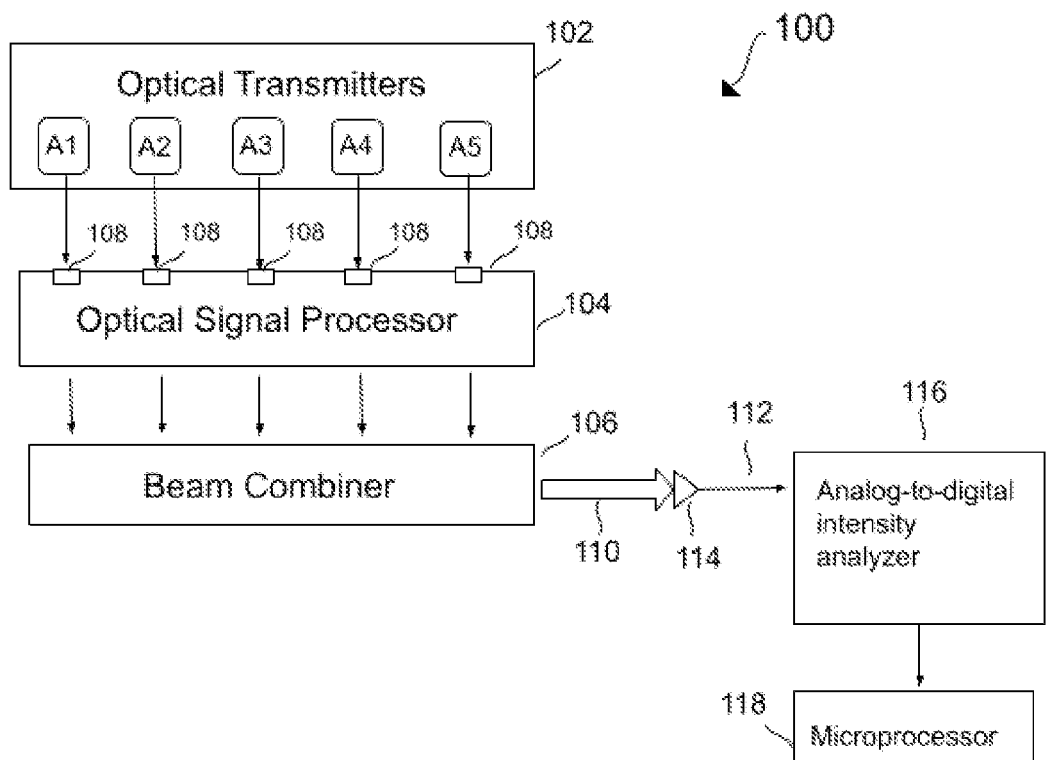
FIG. 1 is a schematic block diagram of a system for multiplexing optical signals for transmission over a communication link in accordance with the present disclosure.

FIG. 1 is a schematic block diagram of one example of a system 100 for multiplexing optical signals for transmission over a communication link in accordance with the present disclosure. The system 100 includes a plurality of optical transmitters 102 that are configured to provide a set of input optical signals to an optical signal processor 104. The system 100, in this example, includes five optical transmitters that produce optical signals A1, A2, A3, A4, and A5. The plurality of optical transmitters 102 may be lasers, for example, that output respective optical signals based on respective digital data signals that are provided to controllers of the optical transmitters.

The optical transmitters 102 in this example have at least two amplitude states. Input digital data signals may be comprised of a series of logical data high values (representing a digital "1") and logical data low values (representing a digital "0"). The combination of high and low signal values represents the data conveyed by the digital data signals. When a digital data signal has a logical data high value, the corresponding optical transmitter (e.g. laser) may be momentarily turned "on" and transmit a beam of light having a first optical intensity in a first amplitude state. When the digital data signal has a logical data low value, the corresponding optical transmitter may be momentarily turned "off" and transmit a beam of light at a second optical intensity in a second amplitude state. The second optical intensity is different than the first optical intensity. In some implementations that use "return-to-zero" optical transmitters, the second optical intensity may be zero. In other implementations that use "non-return-to-zero" optical transmitters, the second optical intensity may be greater than zero but lower than the first optical intensity. Accordingly, each input optical signal in the set of input optical signals produced by the optical transmitters 102 has an optical intensity at a given time in one of at least two amplitude states.

The system 100 further includes an optical signal processor 104 that has a set of optical inputs 108 configured to receive the input optical signals from the optical transmitters 102. In FIG. 1, the optical signal processor 104 has five optical inputs, each of which respectively receive one of the five input optical signals A1 to A5.

The optical signal processor 104 is configured to selectively adjust the optical intensity of the input optical signals A1 to A5 so that each input optical signal A1, A2, A3, A4, and A5 has a respective specific optical intensity for each of the at least two amplitude states of the optical transmitters 102. The respective specific optical intensity of each input optical signal in the at least two amplitude states differs and is specifically chosen such that the respective specific optical intensity of each input optical signal in the at least two amplitude states has a magnitude in which any combination of the input optical signals at any given time sums to a different combined magnitude. By providing each input optical signal with a respective specific optical intensity, a combined beam that is formed from the input optical signals can be measured and quickly analyzed to determine the state of the input optical signals that were combined into the combined beam.

The system 100 includes an optical beam combiner 106 that is configured to combine the set of input optical signals A1 to A5 to form a combined beam 110 for transmission over a communication link 112, such as a fiber optic cable. In this example, the combined beam 110 is delivered to a lens 114, such as an aspheric lens, that directs the combined beam 110 into the communication link 112. The combined beam 110 is thereafter delivered to an analog-to-digital intensity analyzer 116 that is configured to measure the intensity of the combined beam at given instances of time, and using the intensity measurement, the analog-to-digital intensity analyzer 116 is configured to determine which of the input optical signals A1 to A5 were in an "on" state at the given instances of time. Having determined the "on" and "off" state of the input optical signals A1 to A5 at the given instances of time, the analog-to-digital intensity analyzer 116 is able to produce digital data signals and electronically relay the resultant digital data signals to a destination, such as a microprocessor 118.

Figure 1A:
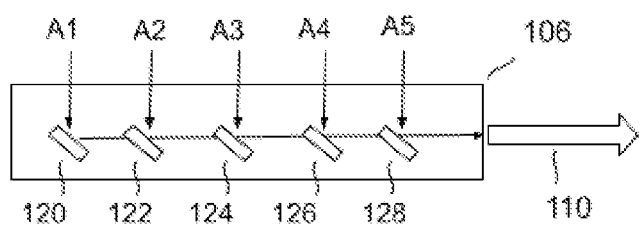
FIG. 1A is a schematic block diagram of one example of an optical beam combiner as shown in FIG. 1.

FIG. 1A is a schematic block diagram of one example of an optical beam combiner 106 that may be used in the system 100 shown in FIG. 1. In FIG. 1A, the optical beam combiner 106 is comprised of a series of beam splitters 120, 122, 124, 126, and 128, that respectively receive the input optical signals A1, A2, A3, A4, and A5. Each of the beam splitters reflects a respective received input optical signal toward an adjacent beam splitter wherein the reflected input optical signal passes through the adjacent beam splitter and is combined with the input optical signal being reflected by the adjacent optical splitter.

For example, as illustrated in FIG. 1A, the beam splitter 120 is arranged to receive and reflect the input optical signal A1 toward the beam splitter 122. The input optical signal A1 passes through the beam splitter 122 and is combined with the input optical signal A2 that is being reflected by the beam splitter 122. The combination of input optical signals A1 and A2 is directed toward and passes through the beam splitter 124 and is combined with the input optical signal A3 that is being reflected by the beam splitter 124. The combination of input optical signals A1, A2, and A3 is directed toward and passes through the beam splitter 126, and is combined with the input optical signal A4 that is being reflected by the beam splitter 126. Lastly, the combination of input optical signals A1, A2, A3, and A4 is directed toward and passes through the beam splitter 128, and is combined with the input optical signal A5 that is being reflected by the beam splitter 128. The final combination of input optical signals A1, A2, A3, A4, and A5 is thereafter output from the optical beam combiner 106 as the combined beam 110, as shown in FIG. 1. The arrangement of beam splitters shown in FIG. 1A is only one example of a beam combiner. Other types of beam combiners that are known in the art may be used to optically combine the input optical signals to form the combined beam 110 as described herein.

As noted above, the optical signal processor 104 is configured to selectively adjust the optical intensity of each of the input optical signals A1 to A5 so that each of the input optical signals has a respective specific optical intensity that can be identified when present in a combined beam. The respective specific optical intensity of each input optical signal is specifically chosen and designated so that, when the input optical signals are combined, the magnitude of the combined beam is uniquely and unambiguously indicative of the combination of the input optical signals that are "on" and present in the combined beam at any given time. This is because the magnitude of the respective specific optical intensity of each input optical signal uniquely and unambiguously sums to a combined magnitude in the combined beam for every combination of the input optical signals in the combined beam.

Figure 2:
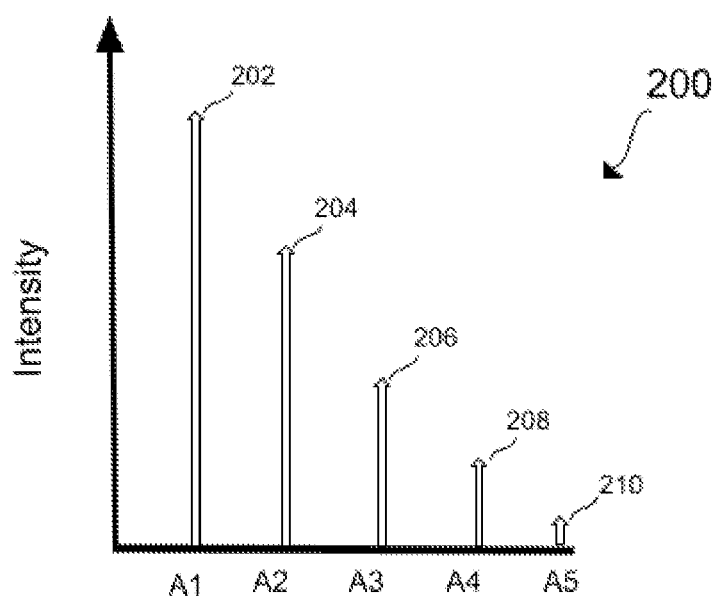
FIG. 2 is a graph illustrating a set of input optical signals, each optical signal having an optical intensity adjusted to a respective specific optical intensity for one of at least two amplitude states of the respective optical signal.

FIG. 2 is a graph 200 illustrating a set of input optical signals, wherein each input optical signal A1, A2, A3, A4, and A5 has an optical intensity that has been adjusted to a respective specific optical intensity 200, 204, 206, 208, and 210, for one of at least two amplitude states of the respective optical signal. As mentioned above and will be appreciated from the further description provided herein, each of the respective specific optical intensities 200, 204, 206, 208, and 210 is designed so that any combination of the input optical signals A1 to A5 in a combined beam sums to a different combined magnitude in the combined beam.

Figure 3:
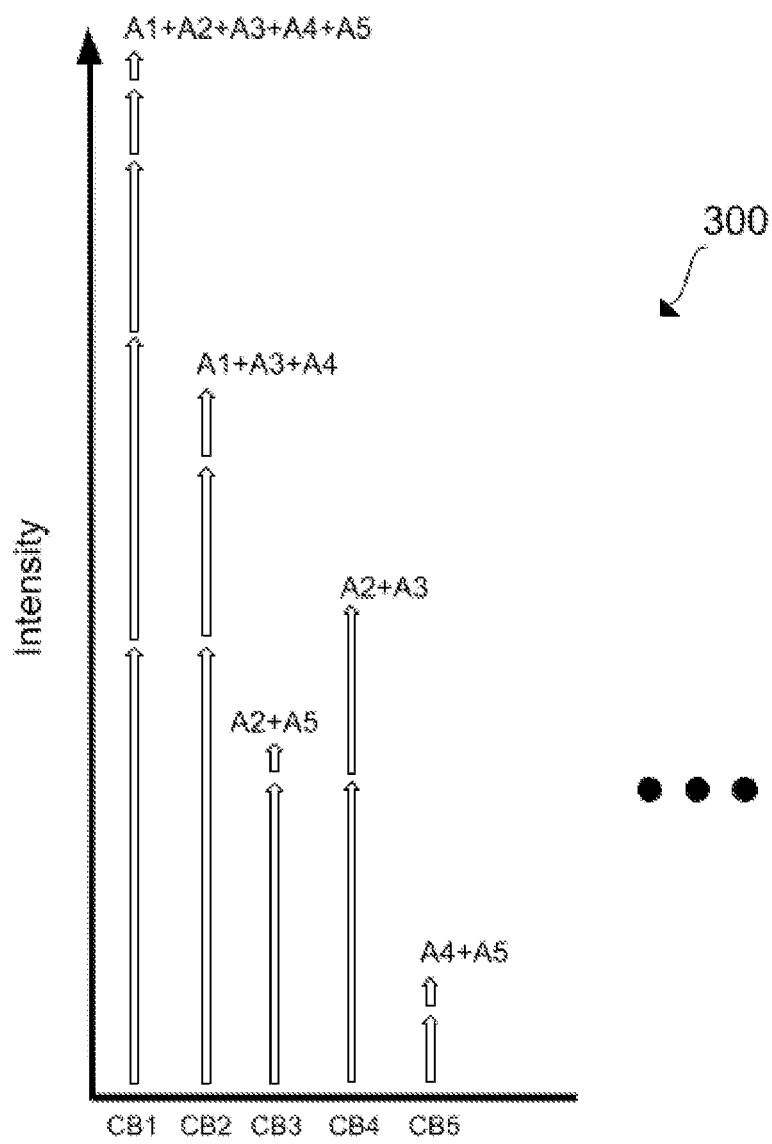
FIG. 3 is a graph illustrating examples of combined beams in which the optical intensity of different combinations of input optical signals at a given time sums to a different combined magnitude.

FIG. 3 is a graph 300 illustrating examples of combined beams in which the optical intensity of different combinations of input optical signals at a given time sums to a different combined magnitude. By way of a first example, a combined beam CB1 has an optical intensity magnitude that is a sum of the input optical signals A1 to A5 in which all of the input optical signals A1 to A5 are presently "on" and transmitting light, e.g., at an optical intensity representing a logical data high value. The combined beam CB1 thus has a combined magnitude that is the sum of all of the individual optical intensities of A1 to A5, as shown in FIG. 2.

By way of a second example, a combined beam CB2 has an optical intensity magnitude that is a sum of the input optical signals A1 to A5 in which input optical signals A1, A3, and A4 are presently "on" and transmitting light, e.g., at an optical intensity representing a logical data high value. The respective specific optical intensities of the input optical signals A1, A3, and A4 in this example combine to produce the combined beam CB2, having a combined magnitude as shown. In this example, input optical signals A2 and A5 are presently "off," representing a logical data low values, and do not contribute to the combined magnitude of the combined beam CB2.

By way of a third example, a combined beam CB3 has an optical intensity magnitude that is a sum of the input optical signals A1 to A5 in which input optical signals A2 and A5 are presently "on" and transmitting light, e.g., at an optical intensity representing a logical data high value. The respective specific optical intensities of the input optical signals A2 and A5 in this example combine to produce the combined beam CB3. Input optical signals A1, A3, and A4 in this example are presently "off" and do not contribute to the combined magnitude of the combined beam CB3.

By way of a fourth example, a combined beam CB4 has an optical intensity magnitude that is a sum of the input optical signals A1 to A5 in which input optical signals A2 and A3 are presently "on" and transmitting light, e.g., at an optical intensity representing a logical data high value. The respective specific optical intensities of the input optical signal A2 and A3 in this example combine to produce the combined beam CB4. The input optical signals A1, A4, and A5 are presently "off" and thus do not contribute to the combined magnitude of the combined beam CB4.

A fifth example in FIG. 3 shows a combined beam CB5 having an optical intensity magnitude that is a sum of the input optical signals A1 to A5 in which input optical signals A4 and A5 are presently "on." The respective specific optical intensities of the input optical signals A4 and A5 combine to produce the combined beam CB5, having a combined magnitude as shown. The input optical signals A1, A2, and A3 are presently "off" and thus do not contribute to the combined magnitude of the combined beam CB5.

The graph 300 in FIG. 3 illustrates only five example combinations of the input optical signals A1 to A5 in which certain input optical signals are presently "on." The ellipses shown in FIG. 3 indicate there are additional combinations of input optical signals not shown in graph 300, each of which sum to form combined beams having uniquely different combined magnitudes of optical intensity. Because the combined magnitude of the combined beam at any given instance of time uniquely represents a combination of input optical signals that are presently "on" and transmitting, a measurement of the combined magnitude of the combined beam at any given time is indicative of the input optical signals that are conveying light, e.g., representative of a logical data high value, at that time. In other words, as shown in FIG. 2, the respective specific optical intensities of each of the input optical signals A1 to A5 are different and contribute differently to the combined optical intensity magnitude of the combined beam at any given time. By design, the sum of the optical intensities of any arbitrary combination of the input optical signals A1 to A5 do not equal the sum of the optical signal intensities of any other combination of the input optical signals A1 to A5.

Figure 4:
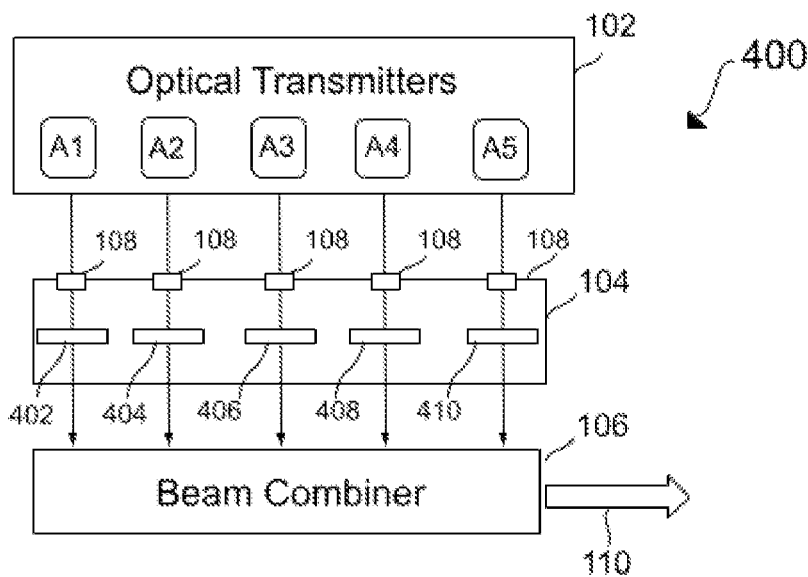
FIG. 4 is a schematic block diagram of a system for multiplexing optical signals in which an optical signal processor includes an arrangement of neutral density filters that selectively attenuate the optical intensity of input optical signals before the input optical signals are combined.

FIG. 4 is a schematic block diagram of a system 400 for multiplexing optical signals in which the optical signal processor 104 includes an arrangement of neutral density filters 402, 404, 406, 408, and 410 that respectively selectively attenuate the optical intensity of the input optical signals A1 to A5 before the input optical signals A1 to A5 are combined by the optical beam combiner 106. Generally, a neutral density filter reduces or attenuates the optical intensity of an input optical signal equally at all wavelengths of light in the input optical signal. The neutral density filters 402, 404, 406, 408, and 410 are arranged in respective transmission paths of the input optical signals A1, A2, A3, A4, and A5 so that the input optical signals A1 to A5 pass through the neutral density filters and their respective optical signal intensities are thereby attenuated.

In particular, the neutral density filter 402 has a light attenuation characteristic that selectively attenuates the optical intensity of the input optical signal A1 to a specific optical intensity, e.g., as shown in FIG. 2. Similarly, the neutral density filters 404, 406, 408, and 410 have respective light attenuation characteristics that selectively attenuate the optical intensity of respective input optical signals A2, A3, A4, and A5 to specific optical intensities, e.g., as shown in FIG. 2. All other aspects of the system 400 are configured as previously described with respect to FIG. 1.

Figure 5:
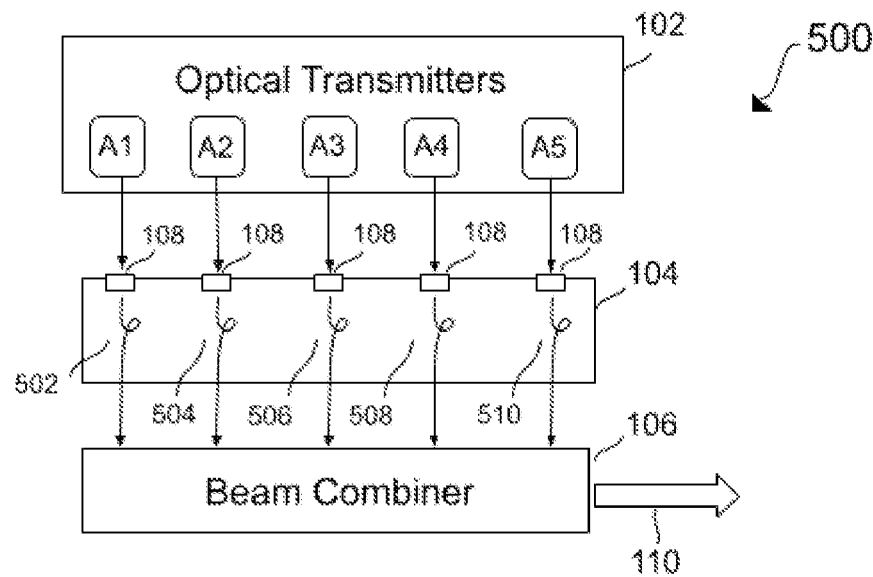
FIG. 5 is a schematic block diagram of a system for multiplexing optical signals in which an optical signal processor includes an arrangement of fiber optic cables that selectively attenuate the optical intensity of input optical signals before the input optical signals are combined.

FIG. 5 is a schematic block diagram of a system 500 for multiplexing optical signals in which an optical signal processor 104 includes an arrangement of fiber optic cables 502, 504, 506, 508, and 510 that selectively attenuate the optical intensity of the input optical signals A1 to A5 before the input optical signals A1 to A5 are combined by the optical beam combiner 106. Fiber optic cables naturally attenuate optical signals that are transmitted through them, e.g., in proportion to the length of the respective fiber optic cable. The fiber optic cables 502, 504, 506, 508, and 510 are arranged in respective transmission paths of the input optical signals A1, A2, A3, A4, and A5 so that the input optical signals A1 to A5 pass through the fiber optic cables and the respective optical signal intensities of the input optical signals are thereby attenuated.

In particular, the fiber optic cable 502 has a light attenuation characteristic (e.g., due to a selected length of the cable 502) that selectively attenuates the optical intensity of the input optical signal A1 to a specific optical intensity, for example as shown in FIG. 2. Similarly, the fiber optic cables 504, 506, 508, and 510 have respective light attenuation characteristics (e.g., by way of different selected cable lengths) that selectively attenuate the optical intensity of respective input optical signals A2, A3, A4, and A5 to specific optical intensities, for example as shown in FIG. 2. All other aspects of the system 500 are configured as previously described with respect to FIG. 1.

Figure 6:
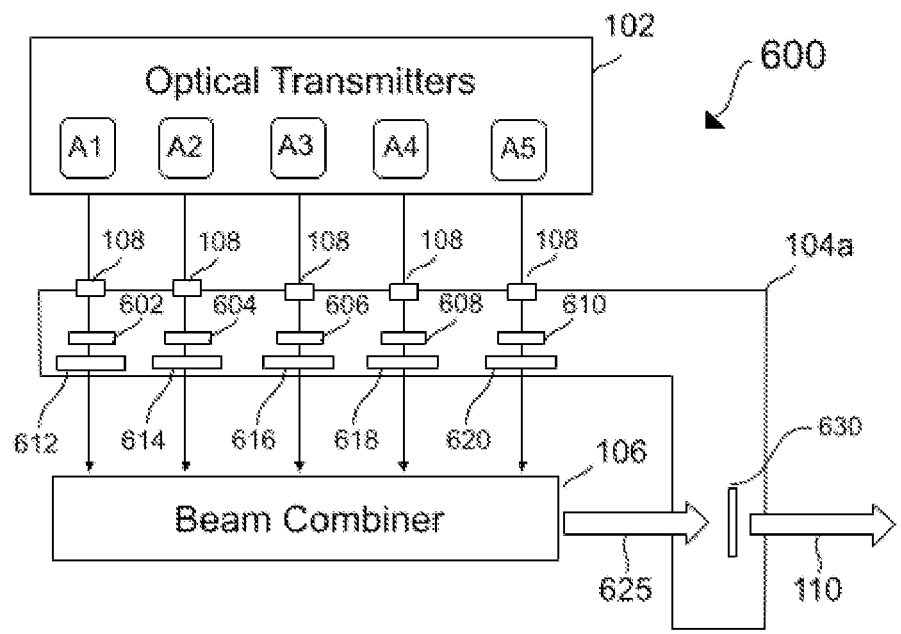
FIG. 6 is a schematic block diagram of a system for multiplexing optical signals in which an optical signal processor includes an arrangement of diffusers and first linear polarizers that polarize the input optical signals before the optical signals are combined, and a second linear polarizer that selectively attenuates the optical intensity of the input optical signals after the input optical signals are combined.

FIG. 6 is a schematic block diagram of a system 600 for multiplexing optical signals in which an optical signal processor 104a includes an arrangement of diffusers 602, 604, 606, 608, and 610 in series with first linear polarizers 612, 614, 616, 618, and 620 that polarize the respective input optical signals A1 to A5 before the optical signals are combined. The optical signal processor 104a further includes a second linear polarizer 630 positioned after the optical beam combiner 106 has combined the input optical signals. The first and second linear polarizers may be linear absorptive polarizers. The second linear polarizer 630 selectively attenuates the optical intensity of the input optical signals A1 to A5 in the combined beam after the input optical signals A1 to A5 are combined.

Thus the present disclosure provides systems with an optical signal processor that includes at least two linear polarizers arranged in series in a transmission path of at least one input optical signal, and as will be described below, the at least two linear polarizers have a difference in polarization angle that selectively attenuates the optical intensity of the at least one input optical signal. The optical intensity of the at least one input optical signal is attenuated to the respective specific optical intensity for at least two amplitude states of the at least one input optical signal.

In particular, in FIG. 6, the at least two linear polarizers for the input optical signal A1 include the first linear polarizer 612 in series with a second linear polarizer 630. The at least two linear polarizers for the input optical signal A2 include the first linear polarizer 614 in series with the second linear polarizer 630. The at least two linear polarizers for the input optical signal A3 include the first linear polarizer 616 in series with the second linear polarizer 630, while the at least two linear polarizers for the input optical signal A4 include the first linear polarizer 618 in series with the second linear polarizer 630. Lastly, the at least two linear polarizers for the input optical signal A5 include the first linear polarizer 620 in series with the second linear polarizer 630.

In all cases, the at least two linear polarizers for each input optical signal A1 to A5 have a difference in polarization angle that selectively attenuates the optical intensity of the respective input optical signal to a respective specific optical intensity, e.g., as shown in FIG. 2. Additional discussion in this regard is provided below with respect to FIGS. 8A and 8B.

In FIG. 6, the transmission path of each input optical signal A1 to A5 is arranged through the respective first linear polarizers 612, 614, 616, 618, and 620 and directs the polarized input optical signals to the optical beam combiner 106. The optical beam combiner 106 combines the input optical signals to form an interim combined beam 625. The transmission path of the interim combined beam 625 is arranged through the second linear polarizer 630 to attenuate the optical intensity of the each component input optical signal A1 to A5 in the interim combined beam 625, thus producing the combined beam 110.

The diffusers 602, 604, 606, 608, and 610 as shown in FIG. 6 are not required, but may be useful to depolarize the input optical signals A1 to A5 before the first linear polarizers 612, 614, 616, 618, and 620 act to polarize the respective input optical signals A1 to A5 to a specific polarization angle. All other aspects of the system 600 are configured as previously described with respect to FIG. 1.

Figure 7:
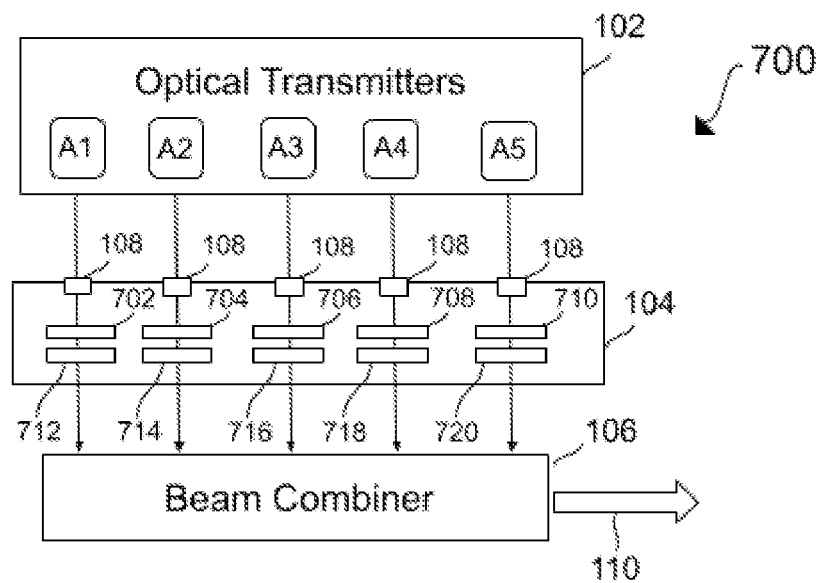
FIG. 7 is a schematic block diagram of a system for multiplexing optical signals in which an optical signal processor includes an arrangement of first and second linear polarizers that selectively attenuate the optical intensity of respective input optical signals before the input optical signals are combined.

FIG. 7 is a schematic block diagram of another system 700 for multiplexing optical signals in which an optical signal processor 104 includes an arrangement of first and second linear polarizers that selectively attenuate the optical intensity of respective input optical signals A1 to A5 before the input optical signals are combined by an optical beam combiner 106.

The transmission path of each input optical signal A1 to A5 is arranged through a respective first linear polarizer and a respective second linear polarizer before the input optical signals are combined to form a combined beam. The respective first linear polarizer and the respective second linear polarizer for each input optical signal have a difference in polarization angle that selectively adjusts the optical intensity of the respective input optical signal to a respective specific optical intensity for at least two amplitude states of the respective input optical signal.

In particular, in FIG. 7 the transmission path of input optical signal A1 is arranged through a respective first linear polarizer 702 and a respective second linear polarizer 712, after which the input optical signal A1 is combined by the optical beam combiner 106 into the combined beam 110. The respective first linear polarizer 702 and the respective second linear polarizer 712 for the input optical signal A1 have a difference in polarization angle that selectively adjusts the optical intensity of the input optical signal A1 to the respective specific optical intensity for the at least two amplitude states of the input optical signal A1.

In a similar manner, the transmission path of the input optical signal A2 is arranged through a respective first linear polarizer 704 and a respective second linear polarizer 714. The transmission path of the input optical signal A3 is arranged through a respective first linear polarizer 706 and a respective second linear polarizer 716. The transmission path of the input optical signal A4 is arranged through a respective first linear polarizer 708 and a respective second linear polarizer 718. The transmission path of the input optical signal A5 is arranged through a respective first linear polarizer 710 and a respective second linear polarizer 720. The combined beam 110 is thereafter formed by the optical beam combiner 106. As with the first and second linear polarizers 702, 712 for the input optical signal A1, the respective first and second linear polarizers for each of the input optical signals A2 to A5 have a difference in polarization angle that selectively adjusts the optical intensity of the respective input optical signal A2 to A5 to the respective specific optical intensity for the at least two amplitude states of the input optical signals A2 to A5.

Figure 8A:
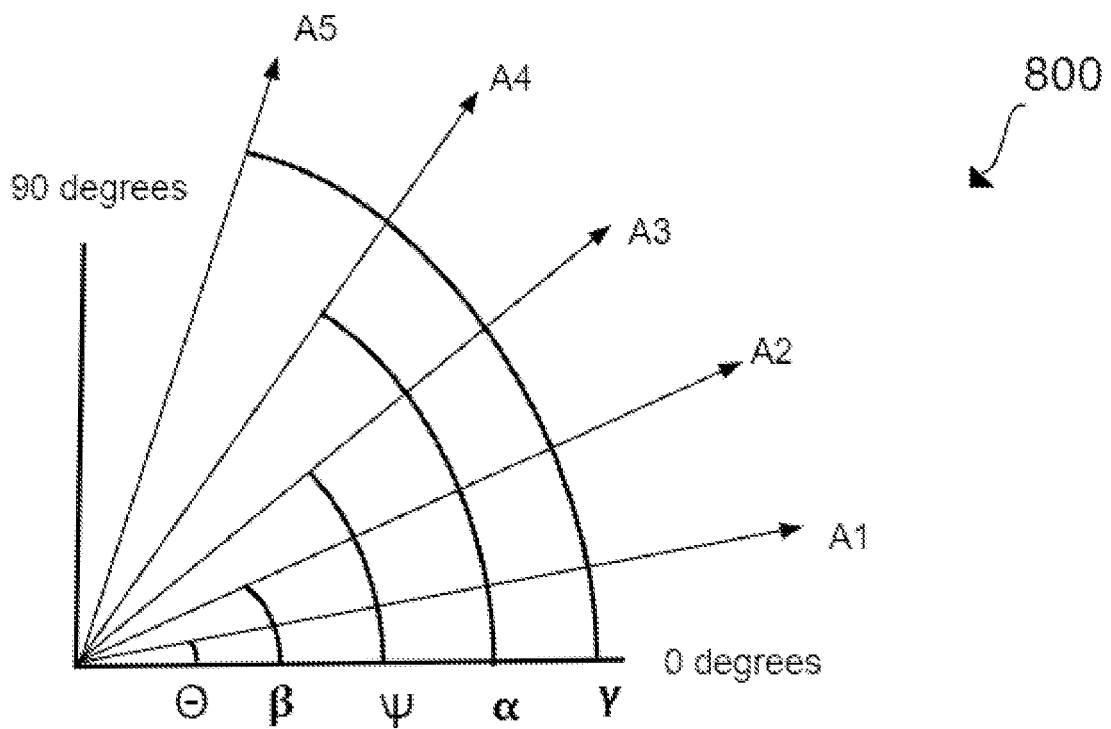
FIG. 8A is a graph illustrating an example in which a set of input optical signals have been polarized by first linear polarizers having different polarization angles.

FIG. 8A is a graph 800 illustrating an example in which a set of input optical signals A1 to A5 have been polarized by first linear polarizers having different polarization angles. Input optical signal A1 is polarized with a polarization angle θ (measured with respect to an axis of 0 degrees). Input optical signal A2 is polarized with a polarization angle β. Input optical signal A3 is polarized with a polarization angle ψ. Input optical signal A4 is polarized with a polarization angle α, while input optical signal A5 is polarized with a polarization angle γ. The first linear polarizers do not attenuate the optical intensity of the input optical signals A1 to A5. Rather, the first linear polarizers are arranged to polarize the input optical signals to specific polarization angles, as shown.

Figure 8B:
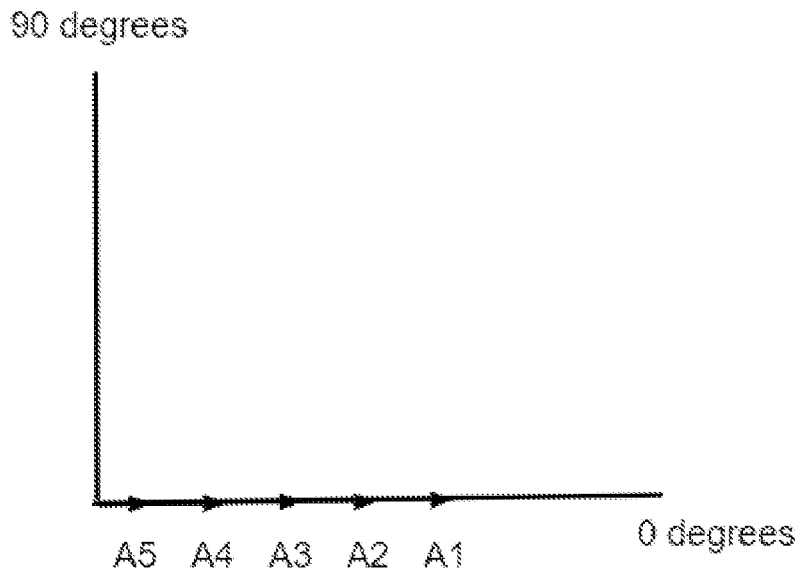
FIG. 8B is a graph illustrating selective attenuation of the polarized input optical signals shown in FIG. 8A by second linear polarizers having the same polarization angle.

FIG. 8B is a graph 802 illustrating selective attenuation of the polarized input optical signals shown in FIG. 8A, by second linear polarizers. The second linear polarizers, e.g., the second linear polarizer 630 shown in FIG. 6 or the second linear polarizers 712, 714, 716, 718, and 720 shown in FIG. 7 receive the polarized input optical signals from the first linear polarizers. The second linear polarizers have a different polarization angle from the first linear polarizers which allows only a component of the respective input optical signals A1 to A5 to pass through. The second linear polarizers are thus arranged to selectively attenuate the optical intensity of the respective input optical signals A1 to A5 to the respective (chosen and designated) specific optical intensity for the at least two amplitude states of the respective input optical signal, e.g. as shown in FIG. 2.

By way of example only, the second linear polarizer(s) may have a polarization angle of 0 degrees as indicated in FIG. 8B, thus allowing only the 0 degree component the polarized input optical signals (shown in FIG. 8A) to pass through. The second linear polarizer(s) attenuate each input optical signal to a respective specific optical intensity that corresponds to the initial optical intensity of the input optical signal multiplied by the cosine squared of their angle from the polarization angle of the first linear polarizer with respect to the polarization angle of the second linear polarizer.

Figure 9:
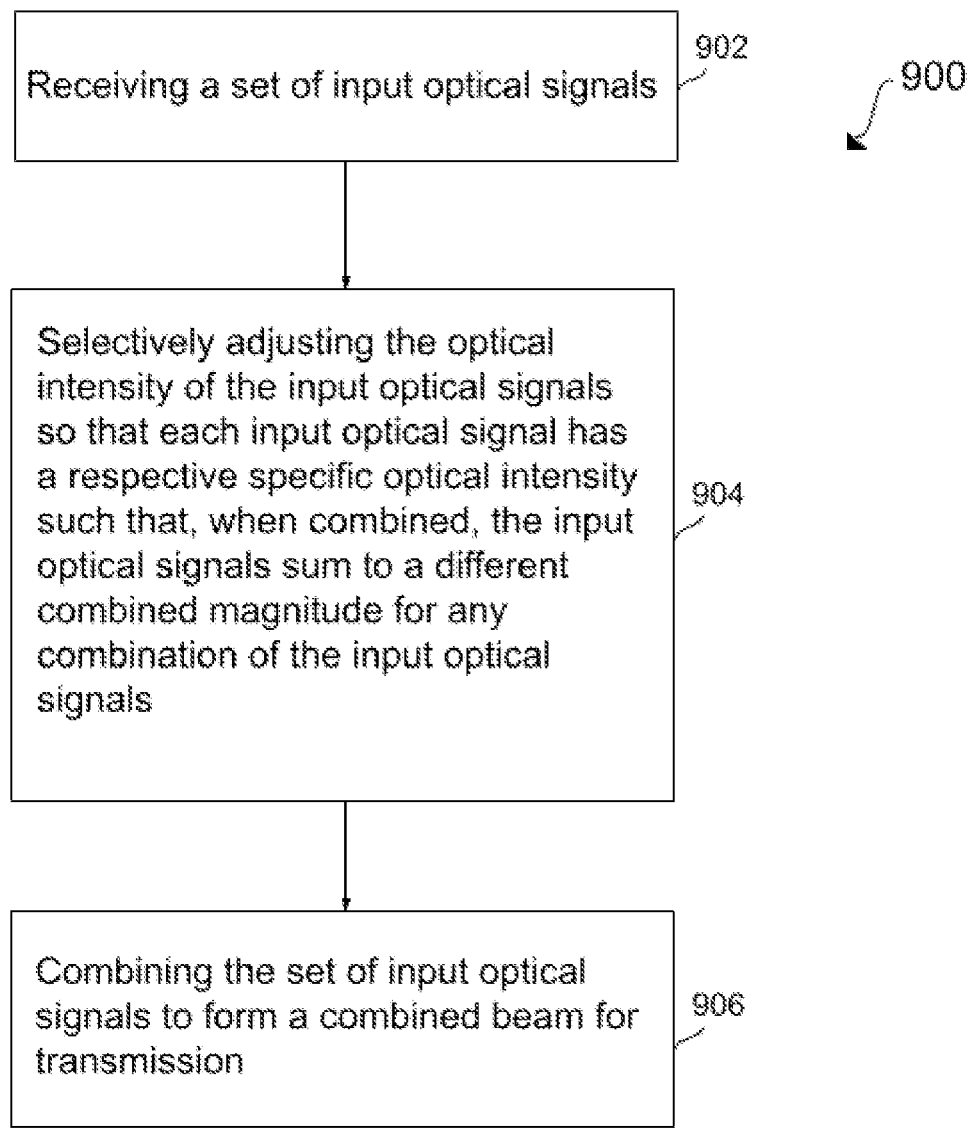
FIG. 9 is a flow diagram illustrating a method for multiplexing optical signals for transmission over a communication link in accordance with the present disclosure.

FIG. 9 is a flow diagram illustrating a method 900 for multiplexing optical signals for transmission over a communication link in accordance with the present disclosure. At a first step 902, the method includes receiving a set of input optical signals. Each input optical signal in the set of input optical signals has an optical intensity at a given time in one of at least two amplitude states.

At a second step 904, the method includes selectively adjusting the optical intensity of the input optical signals in the set of input optical signals so that each input optical signal has a respective specific optical intensity for each of the at least two amplitude states. The respective specific optical intensity of each input optical signal in the at least two amplitude states differs such that the respective specific optical intensity of each input optical signal in the at least two amplitude states has a magnitude in which any combination of the input optical signals at any given time sums to a different combined magnitude.

At a third step 906, the method includes combining the set of input optical signals to form a combined beam for transmission over the communication link.

In some implementations, the step of selectively adjusting the optical intensity of the input optical signals includes selectively attenuating the optical intensity of each input optical signal to the input optical signal's respective specific optical intensity.

In some implementations, the step of selectively adjusting the optical intensity of the input optical signals is performed before combining the set of input optical signals. In other implementations, the step of selectively adjusting the optical intensity of the input optical signals is performed after combining the set of input optical signals.

In some implementations, the step of selectively adjusting the optical intensity of the input optical signals includes arranging at least one neutral density filter in a transmission path of at least one input optical signal in the set of input optical signals. The at least one neutral density filter has a light attenuation characteristic that selectively attenuates the optical intensity of the at least one input optical signal to the respective specific optical intensity for the at least two amplitude states of the at least one input optical signal.

In some implementations, the step of selectively adjusting the optical intensity of the input optical signals includes arranging at least one fiber optic cable in a transmission path of at least one input optical signal in the set of input optical signals. The at least one fiber optic cable has a light attenuation characteristic that selectively attenuates the optical intensity of the at least one input optical signal to the respective specific optical intensity for the at least two amplitude states of the at least one input optical signal.

In some implementations, the step of selectively adjusting the optical intensity of the input optical signals includes arranging at least two linear polarizers in series in a transmission path of at least one input optical signal in the set of input optical signals. The at least two linear polarizers having a difference in polarization angle that selectively attenuates the optical intensity of the at least one input optical signal to the respective specific optical intensity for the at least two amplitude states of at least one input optical signal.

In some cases, the transmission path of the at least one input optical signal may be arranged through a first linear polarizer before the set of input optical signals is combined to form the combined beam, and a transmission path of the combined beam is arranged through a second linear polarizer. The first and second linear polarizers have a difference of polarization angle such that the second linear polarizer selectively attenuates the optical intensity of the at least one input optical signal to the respective specific optical intensity for the at least two amplitude states of the at least one input optical signal.

In some cases, the transmission path of each input optical signal in the set of input optical signals is arranged through a respective first linear polarizer before the set of input optical signals is combined to form the combined beam. Each respective first linear polarizer having a polarization angle that is different than a polarization angle of the other respective first linear polarizers. Furthermore, a transmission path of the combined beam is arranged through a second linear polarizer, wherein the second linear polarizer has a polarization angle that selectively attenuates the optical intensity of each input optical signal in the combined beam to the respective specific optical intensity for the at least two amplitude states of each input optical signal.

In some cases, the transmission path of each input optical signal in the set of input optical signals is arranged through a respective first linear polarizer and a respective second linear polarizer before the set of input optical signals is combined to form the combined beam. The respective first linear polarizer and the respective second linear polarizer for each input optical signal have a difference in polarization angle that selectively attenuates the optical intensity of the respective input optical signal to the respective specific optical intensity for the at least two amplitude states of the respective input optical signal.

In some implementations, each input optical signal in the set of input optical signals has an optical intensity at a given time in one of three or more amplitude states. Accordingly, in accordance with the present disclosure, the optical intensity of the input optical signals is selectively adjusted such that the respective specific optical intensity of each input optical signal in the three or more amplitude states differs such that the respective specific optical intensity of each input optical signal in the three or more amplitude states has a magnitude in which any combination of the input optical signals at any given time sums to a different combined magnitude.

The various embodiments described above can be combined to provide further embodiments. Aspects of the disclosed embodiments can be modified to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for multiplexing optical signals for transmission over a communication link, the method comprising:
   receiving a set of input optical signals, wherein each input optical signal in the set of input optical signals has an optical intensity at a given time in one of at least two amplitude states;
   arranging a respective first linear polarizer in a transmission path of each input optical signal in the set of input optical signals, wherein each respective first linear polarizer has a polarization angle that is different from a polarization angle of other respective first linear polarizers;
   combining the set of input optical signals to form a combined beam;
   arranging a second linear polarizer in a transmission path of the combined beam,
   wherein the respective first linear polarizer and second linear polarizer have a difference in polarization angle that selectively adjusts the optical intensity of the at least one input optical signal so that it has a respective specific optical intensity for each of the at least two amplitude states at the output of the second linear polarizer, and
   wherein the respective specific optical intensity of each input optical signal in the set of input optical signals at the output of the second linear polarizer differs such that any combination of the input optical signals at any given time sums to a different combined magnitude.

2. The method of claim 1, wherein:
   each input optical signal in the set of input optical signals has an optical intensity at a given time in one of three or more amplitude states; and
   the optical intensity of the input optical signals is selectively adjusted such that the respective specific optical intensity of each input optical signal in the three or more amplitude states at the output of the second linear polarizer differs such that the respective specific optical intensity of each input optical signal in the three or more amplitude states at the output of the second linear polarizer has a magnitude in which any combination of the input optical signals at any given time sums to a different combined magnitude.

* * * * *